US012459477B2

(12) United States Patent
Yu et al.

(10) Patent No.: US 12,459,477 B2
(45) Date of Patent: Nov. 4, 2025

(54) DISK BRAKE

(71) Applicant: Hitachi Astemo, Ltd., Hitachinaka (JP)

(72) Inventors: Hao Yu, Hitachinaka (JP); Takuya Usui, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 501 days.

(21) Appl. No.: 17/788,433

(22) PCT Filed: Dec. 10, 2020

(86) PCT No.: PCT/JP2020/045992
§ 371 (c)(1),
(2) Date: Jun. 23, 2022

(87) PCT Pub. No.: WO2021/131736
PCT Pub. Date: Jul. 1, 2021

(65) Prior Publication Data
US 2023/0044286 A1   Feb. 9, 2023

(30) Foreign Application Priority Data

Dec. 25, 2019   (JP) ................. 2019-234340

(51) Int. Cl.
*B60T 13/74*     (2006.01)
*F16D 55/226*    (2006.01)
(Continued)

(52) U.S. Cl.
CPC .......... *B60T 13/746* (2013.01); *F16D 55/226* (2013.01); *F16D 65/097* (2013.01);
(Continued)

(58) Field of Classification Search
CPC ...... F16D 55/226; F16D 65/18; F16D 65/097; F16D 65/183; F16D 2121/24;
(Continued)

(56) References Cited

U.S. PATENT DOCUMENTS

2004/0026187 A1    2/2004  Murayama
2014/0367208 A1*  12/2014  Miyake ................. F16D 55/227
                                                        188/72.3
(Continued)

FOREIGN PATENT DOCUMENTS

| JP | 2000-234640 | 8/2000 |
| JP | 2004-68977  | 3/2004 |
| JP | 2014-167323 | 9/2014 |

OTHER PUBLICATIONS

International Search Report issued Jan. 12, 2021 in International Application No. PCT/JP2020/045992, with English Translation.
(Continued)

*Primary Examiner* — Robert A. Siconolfi
*Assistant Examiner* — San M Aung
(74) *Attorney, Agent, or Firm* — Wenderoth, Lind & Ponack, L.L.P.

(57) ABSTRACT

A disk brake includes a brake mechanism configured to apply a braking force by advancing a piston in a cylinder portion based on driving of an electric motor to thus press inner and outer brake pads against a disk rotor, and an elastic member configured to bias the inner and outer brake pads in an axial direction of the disk rotor and in a direction away from the disk rotor. A biasing force of the elastic member is greater than sliding resistance of the piston on the cylinder portion. Due to this configuration, the disk brake can effectively prevent or reduce the drags of the inner and outer brake pads.

14 Claims, 4 Drawing Sheets

(51) Int. Cl.
    *F16D 65/097*      (2006.01)
    *F16D 65/18*      (2006.01)
    *F16D 121/24*      (2012.01)
    *F16D 125/40*      (2012.01)
    *F16D 127/02*      (2012.01)

(52) U.S. Cl.
    CPC .......... *F16D 65/18* (2013.01); *F16D 2121/24* (2013.01); *F16D 2125/40* (2013.01); *F16D 2127/02* (2013.01)

(58) Field of Classification Search
    CPC ............. F16D 2121/34; F16D 2125/40; F16D 2127/02; F16D 2055/0029; F16D 2066/003; F16D 2066/005; B60T 13/741; B60T 13/746
    USPC ........................................................ 18/72.3
    See application file for complete search history.

(56) References Cited

U.S. PATENT DOCUMENTS

| | | | | |
|---|---|---|---|---|
| 2016/0102722 | A1* | 4/2016 | Foucoin .............. | F16D 65/0979 188/196 R |
| 2018/0274611 | A1* | 9/2018 | Song ....................... | F16D 65/18 |
| 2019/0293133 | A1* | 9/2019 | Brandl ................ | F16D 65/0977 |

OTHER PUBLICATIONS

Written Opinion of the International Searching Authority issued Jan. 12, 2021 in International Application No. PCT/JP2020/045992, with English Translation.

\* cited by examiner

DISK BRAKE

TECHNICAL FIELD

The present invention relates to a disk brake used to brake a vehicle.

BACKGROUND ART

A disk brake apparatus discussed in PTL 1 has been proposed as a structure for preventing or reducing a pad drag among conventional disk brakes. The disk brake apparatus discussed in this patent literature, PTL 1 is equipped with a Belleville washer that returns a piston axially slidably fitted to a cylinder portion in the axial direction thereof. As a result, when a braking operation is released, the piston is returned in the axial direction thereof by the biasing force of the Belleville washer against a frictional engagement force generated between the piston and the wall surface of the cylinder portion. This facilitates separation of an inner pad from a disk rotor, thereby suppressing a drag phenomenon of the inner pad, i.e., a drag torque.

CITATION LIST

Patent Literature

PTL 1: Japanese Patent Application Public Disclosure No. 2004-68977

SUMMARY OF INVENTION

Technical Problem

However, the above-described disk brake apparatus discussed in PTL 1 fails to be equipped with a return mechanism for the pad, thereby being less effective in reducing the drag torque. Further, normally, disk brakes should include a pad wear following mechanism that advances the piston according to the wear of the pad, but the disk brake apparatus discussed in PTL 1 leads to the complication of the structure thereof.

Under these circumstances, an object of the present invention is to provide a disk brake capable of effectively reducing a drag of a pad.

Solution to Problem

A first aspect of the present invention is a disk brake including a brake mechanism configured to apply a braking force by advancing a piston in a cylinder portion based on driving of an electric motor to thus press a pad against a disk rotor, and an elastic member configured to bias the pad in an axial direction of the disk rotor and in a direction away from the disk rotor. A biasing fierce of the elastic member is greater than sliding resistance of the piston on the cylinder portion.

Further, a second aspect of the present invention is a disk brake including a brake mechanism. The brake mechanism includes a mounting member configured to support a sliding movement of a pad and be mounted on a non-rotational portion of a vehicle, and a caliper including a cylinder portion and supported slidably in an axial direction of a disk rotor relative to the mounting member. The brake mechanism is configured to apply a braking force by pressing the pad against the disk rotor using a piston that slidably moves in the cylinder portion. The disk brake further includes an elastic member configured to bias the pad in the axial direction of the disk rotor and in a direction away from the disk rotor. A biasing force of the elastic member is weaker than sliding resistance of the piston on the cylinder portion and greater than a force acquired by adding sliding resistance of the pad on the mounting member and sliding resistance of the caliper on the mounting member.

According to one aspect of the present invention, the disk brake can effectively prevent or reduce the drag of the pad.

DESCRIPTION OF EMBODIMENTS

In the following description, an embodiment of the present invention will be described in detail with reference to FIGS. 1 to 4.

Figure 1:
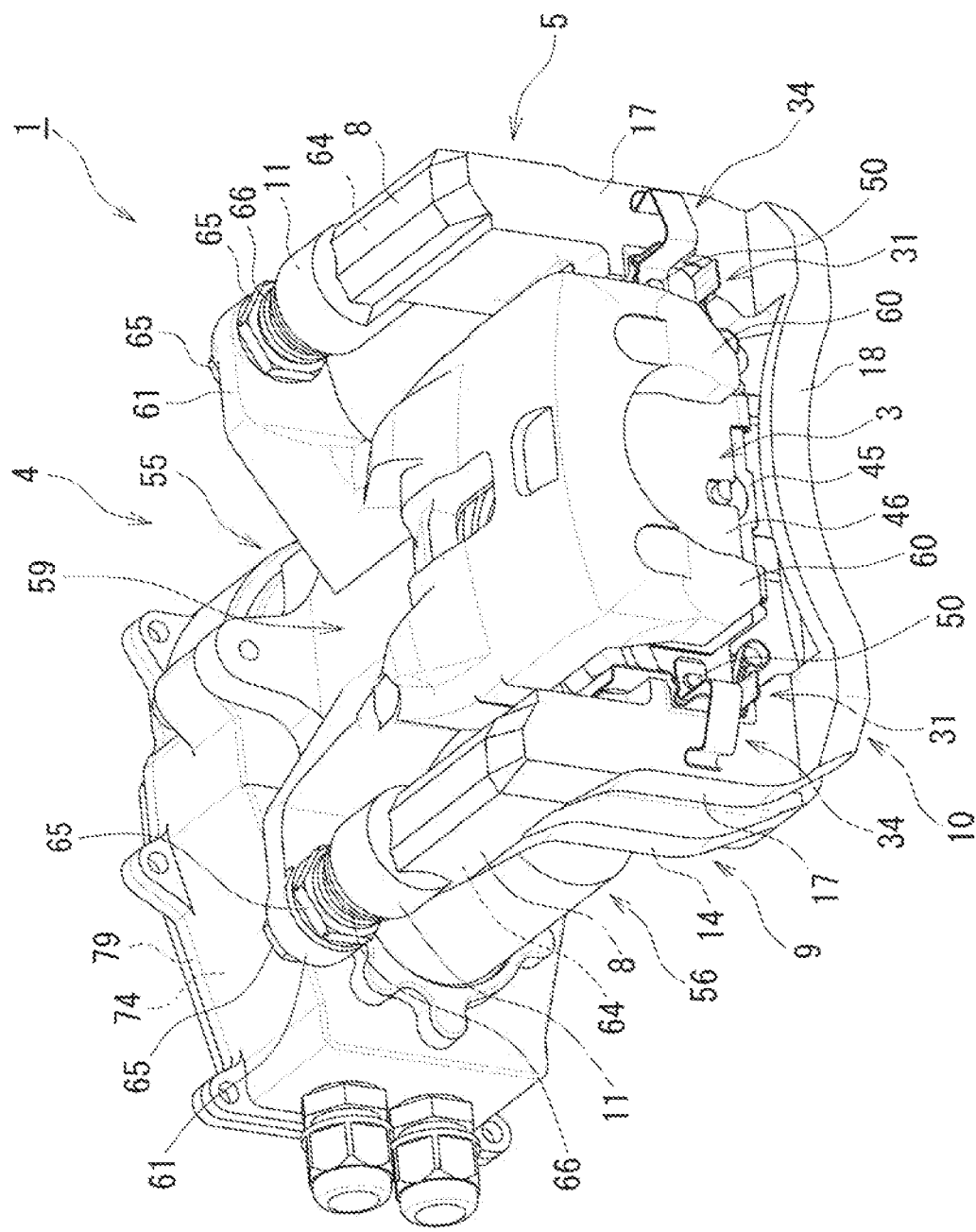
FIG. 1 is a perspective view of a disk brake according to an embodiment of the present invention.
Figure 2:
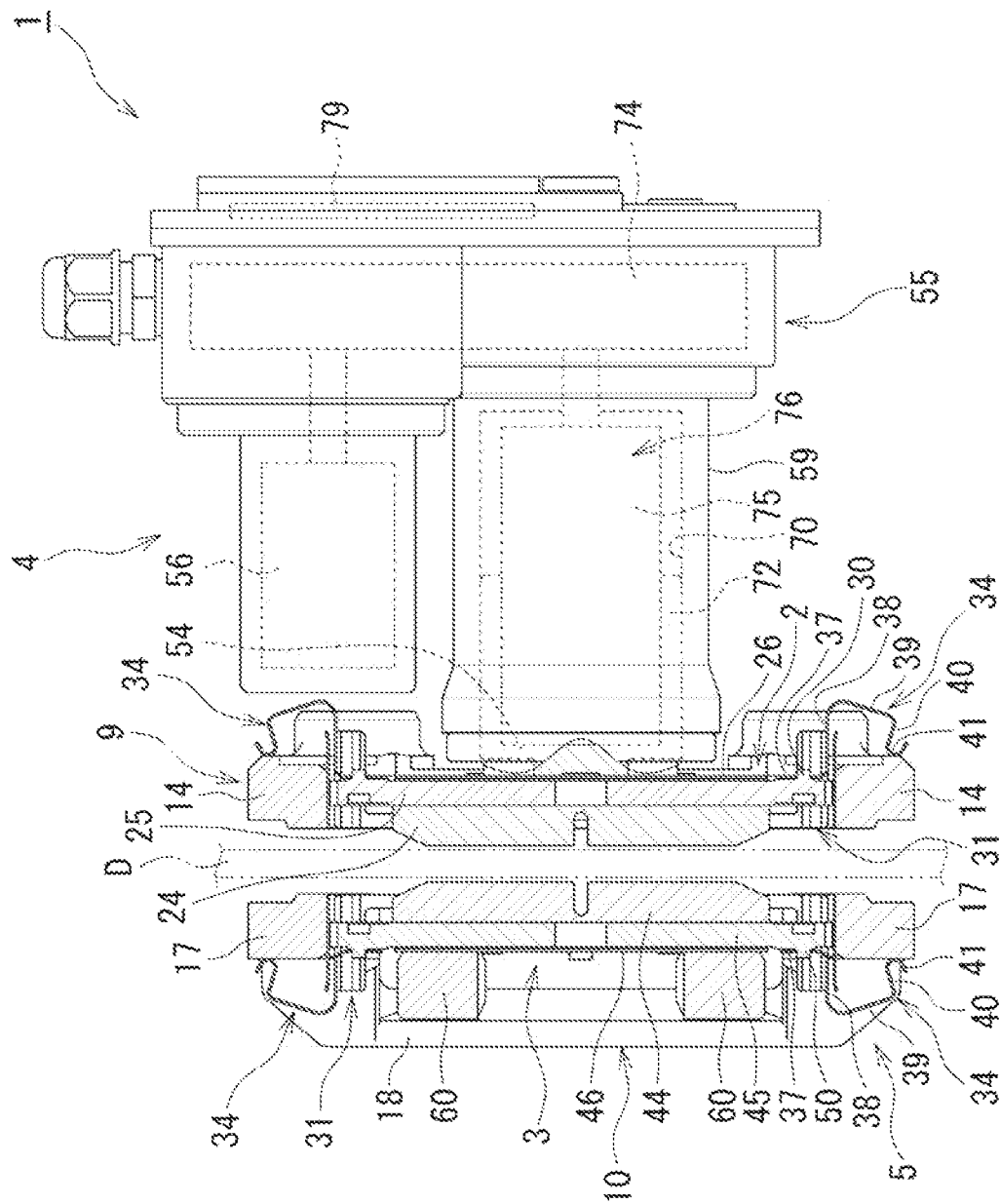
FIG. 2 is a partial cross-sectional view of the disk brake according to the embodiment of the present invention.
Figure 3:
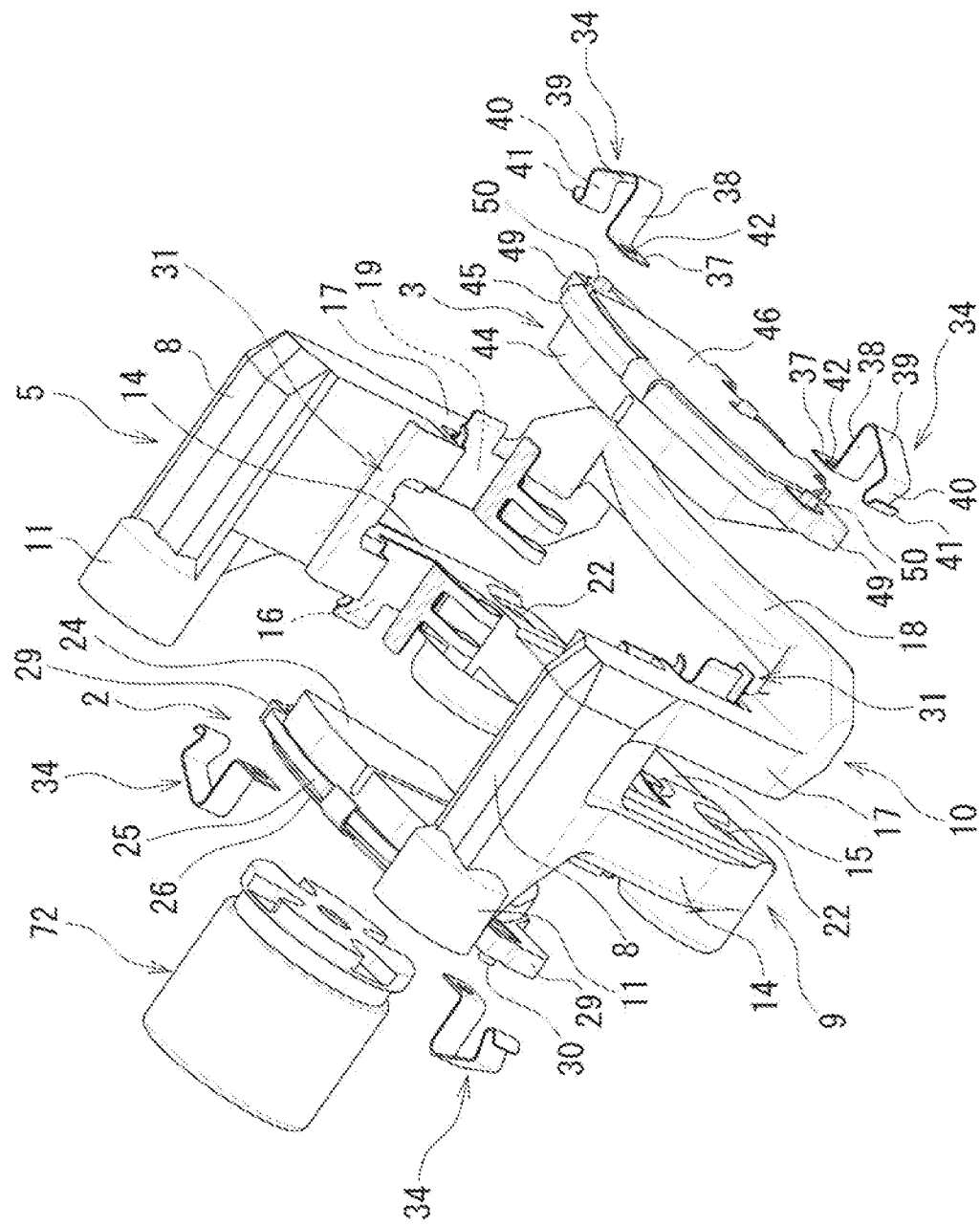
FIG. 3 is an exploded perspective view of main portions of the disk brake according to the embodiment of the present invention.

As illustrated in FIGS. 1 to 3, a disk brake 1 according to the embodiment of the present invention is employed as an electric brake apparatus that generates a braking force based on driving of an electric motor 56. A pair of inner and outer brake pads 2 and 3, and a caliper 4 are provided in the present disk brake 1. The pair of inner and outer brake pads 2 and 3 is disposed so as to sandwich a disk rotor D mounted at a rotational portion (not illustrated) of a vehicle on both the axial sides of the disk rotor D. The present disk brake 1 is configured as a floating caliper-type disk brake. The pair of inner and out brake pads 2 and 3, and the caliper 4 are supported on a bracket 5 movably in the axial direction of the disk rotor D. The bracket 5 is fixed to a non-rotational portion (not illustrated) such as a knuckle of the vehicle. This bracket 5 corresponds to a mounting member.

The bracket 5 includes a pair of pin fitted insertion portions 8 and 8 and inner-side and outer-side support portions 9 and 10. Slide pins 64 and 64, which will be described below, are inserted through the pin fitted insertion portions 8 and 8, respectively. The inner-side and outer-side support portions 9 and 10 are integrally connected to the pair of pin fitted insertion portions 8 and 8, and support the inner and outer brake pads 2 and 3 individually independently. The pair of pin fitted insertion portions 8 and 8 is disposed at an interval along the rotational direction of the disk rotor D. The pair of pin fitted insertion portions 8 and 8 each extends along the axial direction of the disk rotor D together. Each of the pin fitted insertion portions 8 is formed into a bottomed cylindrical shape. The slide pin 64 is axially slidably inserted through inside each of the pin fitted insertions 8.

The opening side and the bottom portion side of each of the pin fitted insertion portions 8 are directed to an inner side and an outer side, respectively. Cylindrical pinhole boss portions 11 and 11 are formed at the end portions of the pin fitted insertion portions 8 on the inner side, respectively. The outer-side support portion 10 is integrally connected to the outer side of each of the pin fitted insertion portions 8. Further, the inner-side support portion 9 is connected to each of the pin fitted insertion portions 8 at an interval from the outer-side support portion 10 to the inner side along the axial direction of the disk rotor D.

The inner-side support portion 9 includes a pair of inner-side arm portions 14 and 14 and an inner-side beam portion 15. The inner-side arm portions 14 and 14 extend from the pair of pin fitted insertion portions 8 and 8 approximately perpendicularly thereto, respectively. The inner-side beam portion 15 connects the end portions of this pair of inner-side arm portions 14 and 14 to each other. Fitted recessed portions 16 and 16 are formed on the surfaces of the pair of inner-side arm portions 14 and 14 that face each other, respectively. Each of the fitted recessed portions 16 and 16 is formed along the axial direction of the disk rotor D. Pad springs 31 are fitted in the fitted recessed portions 16 of the inner-side arm portions 14 and fitted recessed portions 19 of the outer support portion 10 (outer-side arm portions 17), which will be described below, so as to extend across them. Through-holes 22 and 22 are formed at both the ends of the inner-side beam portion 15 in the rotational direction of the disk rotor D, respectively. The through-holes 22 and 22 extend therethrough along the axial direction of the disk rotor D.

The inner brake pad 2 includes an inner lining 24, an inner back plate 25, and an inner shim 26. The inner lining 24 receives a frictional force due to contact with the disk rotor D. The inner back plate 25 is disposed on the back surface opposite from the front surface of this inner lining 24 that is in contact with the disk rotor D. The inner shim 26 is disposed on the back surface opposite from the front surface of this inner back plate 25 that is in contact with the inner lining 24. Fitted portions 29 and 29 are formed on the inner back plate 25 at both the end portions thereof in the rotational direction of the disk rotor D, respectively. The fitted portions 29 and 29 protrude out of the inner back plate 25. Fixation boss portions 30 and 30 are provided around the fitted portions 29 and 29 in a manner protruding toward the inner side, respectively. The fixation boss portions 30 and 30 are used to fix elastic members 34 and 34, which will be described below.

Then, the inner brake pad 2 is disposed between the pair of inner-side arm portions 14 and 14 with the aid of fitted engagement of each of the fitted portions 29 and 29 of the inner back plate 25 thereof in each of the fitted recessed portions 16 and 16 provided on the facing surfaces of the pair of inner-side arm portions 14 and 14 via the pad springs 31 and 31. As a result, the inner brake pad 2 is supported slidably along the axial direction of the disk rotor D relative to the pair of inner-side arm portions 14 and 14. Then, sliding resistance of the inner brake pad 2 on the pair of inner-side arm portions 14 and 14 is generated at the time of brake application and at the time of brake release.

Figure 4:
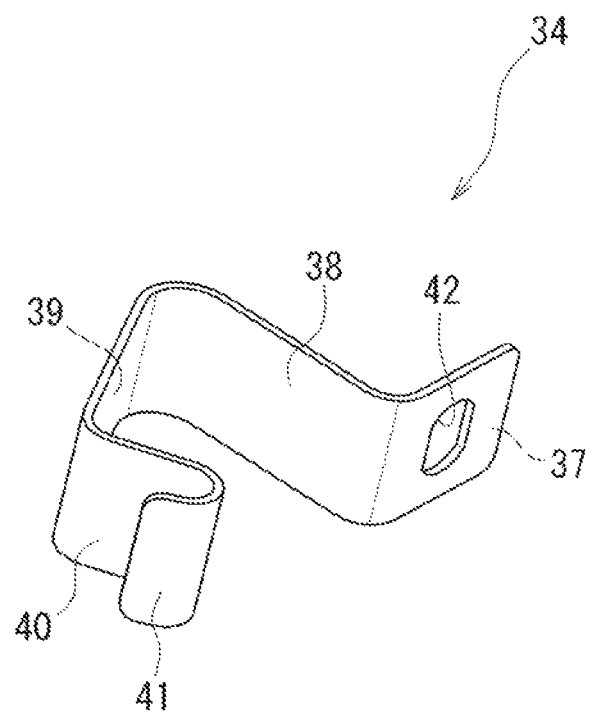
FIG. 4 is a perspective view of an elastic member employed in the disk brake according to the embodiment of the present invention.

The elastic members 34 are disposed on the inner brake pad 2, more specifically, between the inner back plate 25 and the inner-side support portion 9 of the bracket 5. A pair of elastic members 34 and 34 is disposed at an interval along the rotational direction of the disk rotor D. The pair of elastic members 34 and 34 biases the inner brake pad 2 in the axial direction of the disk rotor D and toward the inner side, i.e., in a direction away from the disk rotor D. In other words, the pair of elastic members 34 and 34 biases the inner brake pad 2 in the direction away from the disk rotor D relative to the inner-side support portion 9 of the bracket 5. As illustrated in FIG. 4, also referring to FIG. 2, the elastic members 34 are each formed by bending a thin, elongated, and generally rectangular spring plate member at a plurality of portions. More specifically, the elastic members 34 each include a fixation portion 37, an erected portion 38, an inclined portion 39, a facing portion 40, and a contact portion 41. The fixation portion 37 is fixed to the fixation boss portion 30 provided on the inner back plate 25 of the inner brake pad 2. The erected portion 38 extends continuously from the end portion of this fixation portion 37. The inclined portion 39 extends continuously from the end portion of this erected portion 38. The facing portion 40 extends continuously from this inclined portion 39. The contact portion 41 extends continuously from the end portion of this facing portion 40.

A fixation hole 42 is formed at the fixation portion 37. The fixation hole 42 is used to fix the elastic member 34 to the fixation boss portion 30 of the inner back plate 25. The erected portion 38 extends from the end portion of the fixation portion 37 generally perpendicularly to this fixation portion 37. The erected portion 38 extends in a direction away from the fixation portion 37 (the inner back plate 25). The inclined portion 39 extends from the end portion of the erected portion 38 toward the inner-side arm portion 14 with the elastic member 34 in a mounted state. The inclined portion 39 extends while being inclined with respect to the longitudinal direction of the inner brake pad 2 so as to approach the inner-side arm portion 14 with the elastic member 34 in the mounted state. The facing portion 40 extends while facing the erected portion 38. The facing portion 40 extends while being inclined slightly inward with respect to the axial direction of the disk rotor D with the elastic member 34 in the mounted state. In other words, the facing portion 40 extends while being inclined so as to gradually reduce the distance between the facing portion 40 and the erected portion 38. The contact portion 41 extends while being curved outward in a semi-circular arc manner with the elastic member 34 in the mounted state. The outer peripheral surface of the contact portion 41 is in contact with the surface of the inner-side arm portion 14 on the inner side with the elastic member 34 in the mounted state.

Then, the fixation boss portions 30 provided on the inner back plate 25 of the inner brake pad 2 are inserted through the fixation holes 42 provided on the fixation portions 37 of the elastic members 34, respectively, by which the pair of elastic members 34 and 34 is each fixed to this inner back plate 25. At this time, the outer peripheral surfaces of the contact portions 41 and 41 of the elastic members 34 and 34 are in contact with the surfaces of the inner-side arm portions 14 and 14 of the bracket 5 on the inner side, respectively. As a result, the inner brake pad 2 is biased by each of the elastic members 34 and 34 in the axial direction of the disk rotor D and toward the inner side, i.e., in the direction away from the disk rotor D relative to the inner-side support portion 9.

The outer-side support portion 10 includes a pair of outer-side arm portions 17 and 17 and an outer-side beam portion 18. The outer-side arm portions 17 and 17 extend from the pin fitted insertion portions 8 and 8 approximately perpendicularly, respectively. The outer-side beam portion 18 connects the end portions of this pair of outer-side arm portions 17 and 17 to each other. The fitted recessed portions 19 and 19 are formed on the surfaces of the pair of outer-side arm portions 17 and 17 that face each other, respectively. Each of the fitted recessed portions 19 and 19 is formed along the axial direction of the disk rotor D. As described above, the pad springs 31 are fitted to the fitted recessed portions 16 of the inner support portion 9 (the inner-side arm portions 14) and the fitted recessed portions 19 of the outer-side arm portions 17 so as to extend across them. The bracket 5 is mounted on the non-rotational portion of the vehicle via each of the through-holes 22 and 22 provided at the inner-side support portion 9 (the inner-side beam portion 15).

The outer brake pad 3 includes an outer lining 44, an outer back plate 45, and an outer shim 46, similarly to the inner brake pad 2. The outer lining 44 receives a frictional force due to contact with the disk rotor D. The inner back plate 45 is disposed on the back surface opposite from the front surface of this outer lining 44 that is in contact with the disk rotor D. The outer shim 46 is disposed on the back surface opposite from the front surface of this outer back plate 45 that is in contact with the outer lining 44. Fitted portions 49 and 49 are formed on the outer back plate 45 at both the end portions thereof in the rotational direction of the disk rotor D, respectively. The fitted portions 49 and 49 protrude out of the outer back plate 45. Fixation boss portions 50 and 50 are provided around the fitted portions 49 and 49 in a manner protruding toward the outer side, respectively. The fixation boss portions 50 and 50 are used to fix elastic members 34 and 34.

Then, the outer brake pad 3 is disposed between the pair of outer-side arm portions 17 and 17 with the aid of fitted engagement of each of the fitted portions 49 and 49 of the outer back plate 45 thereof in each of the fitted recessed portions 19 and 19 provided on the facing surfaces of the pair of outer-side arm portions 17 and 17 via the pad springs 31 and 31. As a result, the outer brake pad 3 is supported slidably along the axial direction of the disk rotor D relative to the pair of outer-side arm portions 17 and 17. Then, sliding resistance of the outer brake pad 3 on the pair of outer-side arm portions 17 and 17 is generated at the time of the brake application and at the time of the brake release.

The elastic members 34 are disposed on the outer brake pad 3, more specifically, between the outer back plate 45 and the outer support portion 10 of the bracket 5. A pair of elastic members 34 and 34 is disposed at an interval along the rotational direction of the disk rotor D. The pair of elastic members 34 and 34 biases the outer brake pad 3 in the axial direction of the disk rotor D and toward the outer side, i.e., in a direction away front the disk rotor D. In other words, the pair of elastic members 34 and 34 biases the outer brake pad 3 in the direction away from the disk rotor D relative to the outer-side support portion 10 of the bracket 5. These outer-side elastic members 34 are configured in a similar manner to the inner-side elastic members 34 provided between the inner brake pad 2 and the bracket 5, and therefore the description thereof will be omitted here.

Then, the fixation boss portions 50 provided on the outer back plate 45 of the outer brake pad 3 are inserted through the fixation holes 42 provided on the fixation portions 37 of the elastic members 34, respectively, by which the pair of elastic members 34 and 34 is each fixed to this inner back plate 45. At this time, the outer peripheral surfaces of the contact portions 41 and 41 of the elastic members 34 and 34 are in contact with the surfaces of the outer-side arm portions 15 of the bracket 5 on the outer side, respectively. As a result, the outer brake pad 3 is biased by each of the elastic members 34 and 34 in the axial direction of the disk rotor D and toward the outer side, i.e., in the direction away from the disk rotor D relative to the outer-side support portion 10. The biasing forces of the elastic members 34 will be described in detail below.

Further, as illustrated in FIGS. 1 and 2, the caliper 4 includes a caliper main body 55 and an electric motor 56. The caliper main body 55 is the main body of the caliper 4. The electric motor 56 is disposed so as to be arranged side by side with the caliper main body 55. The caliper 4 is configured in such a manner that a cylindrical cylinder portion 59, a pair of claw portions 60 and 60, and a pair of caliper arm portions 61 and 61 are integrally formed on the caliper main body 55. The cylinder portion 59 is disposed on the proximal end side facing the inner brake pad 2 on the internal side of the vehicle, and is opened in face of this inner brake pad 2. The pair of claw portions 60 and 60 extends from the cylinder portion 59 to the outer side across over the disk rotor D, and is disposed on the distal end side facing the outer brake pad 3 on the external side of the vehicle. The pair of caliper arm portions 61 and 61 each extend from the cylinder portion 59 outward.

The slide pins 64 and 64 are fixed to the distal end portions of the pair of caliper arm portions 61 and 61 using fixation nuts 65 and 65, respectively. Each of the slide pins 64 and 64 extends along the axial direction of the cylinder portion 59. Then, as described above, the slide pins 64 and 64 extending from the cylinder portion 59 are axially slidably inserted through the pair of pin fitted insertion portions 8 and 8 of the bracket 5, respectively. Then, sliding resistance of each of the slide pins 64 and 64 on each of the pin fitted insertion portions 8 and 8 is generated at the time of the brake application and at the time of the brake release. Pin boots 66 and 66 made from rubber are provided between the caliper arm portions 61 and 61 of the caliper main body 55 and the pin fitted insertion portions 8 and 8 of the bracket 5, respectively. The pin boots 66 and 66 include extensible/compressible bellows portions covering the slide pins 64 and 64.

Referring to FIG. 2, a cylinder bore 70 is formed inside the cylinder portion 59. A piston 72 is disposed in the cylinder bore 70 of the cylinder portion 59 slidably along the axial direction. A seal member (not illustrated) is disposed between the outer peripheral surface of the piston 72 and the inner peripheral surface of the cylinder bore 70. The piston 72 functions to press the inner brake pad 2, and is formed into a cupped shape. The piston 72 is arranged in the cylinder bore 70 in such a manner that a bottom portion 54 thereof faces the inner brake pad 2. The bottom portion 54 of the piston 72 and the inner brake pad 2 are relatively non-rotatably engaged with each other. Due to this engagement, the piston 72 is prohibited from rotating relative to the cylinder bore 70 and thus the caliper main body 55. Then, sliding resistance of the piston 72 on the cylinder bore 70 is generated at the time of the brake application and at the time of the brake release.

A brake mechanism 76 and a control device 79 are provided in the caliper main body 55. The brake mechanism 76 includes a speed reduction mechanism 74 and a rotation-linear motion conversion mechanism 75. The speed reduction mechanism 41 slows down a rotation of the electric motor 56 to power up a rotational torque thereof. A rotation from this speed reduction mechanism 74 is transmitted to the rotation-linear motion conversion mechanism 75, and the rotation-linear motion conversion mechanism 75 applies a thrust force to the piston 72 thereby. The speed reduction mechanism 74 includes a planetary gear speed reduction mechanism or the like to which the rotation from the electric motor 56 is transmitted, and the rotation from the electric motor 56 is slowed down and powered up by this speed reduction mechanism 74 and then transmitted to the rotation-linear motion conversion mechanism 75.

The rotation-linear motion conversion mechanism 75 includes, for example, a shaft member (a rotational member) to which the rotation from the speed reduction mechanism 74 is transmitted, and a nut member (a linear motion member) threadably engaged with this shall member, although they are not illustrated. In other words, in this rotation-linear motion conversion mechanism 75, the shaft member is supported axially immovably, and the nut member is supported axially movably and is also supported non-rotatably relative to the cylinder portion 59. Then, when this rotation-linear motion conversion mechanism 75 is actuated, the nut member linearly moves due to a rotation of the shall member, thereby starting to press the piston 72.

Further, the rotation-linear motion conversion mechanism 75 includes, for example, a shaft member (a rotation-linear motion member) to which the rotation from the speed reduction mechanism 74 is transmitted and a nut member (a fixed member) threadably engaged with this shaft member although they are not illustrated, and the shaft member is supported rotatably and axially movably relative to the cylinder portion 59. On the other hand, the nut member is supported non-rotatably relative to the cylinder portion 59, and is also supported axially immovably. Then, when this rotation-linear motion conversion mechanism 75 is actuated, the shaft member linearly moves while rotating relative to the nut member, thereby starting to press the piston 72.

Then, when the rotation-linear motion conversion mechanism 75 is actuated at the time of the brake application and at the time of the brake release, sliding resistance is generated at a threaded engagement portion between the shaft member and the nut member.

The control device 79 functions to control the driving force of the electric motor 56 based on the positional information of the piston 72, More specifically, various sensors are electrically connected to the control device 79, and these sensors include a rotational angle detector that detects the rotational angle of the electric motor 56, a thrust force sensor that detects a reaction force when the disk rotor D is pressed by the inner and outer brake pads 2 and 3, a detection sensor that detects a request from a driver such as a stroke sensor mounted on a brake pedal, and various detection sensors that detect various situations requiring brake without the driver issuing a request, although they are not illustrated. Then, at the time of the brake application and at the time of the brake release when the vehicle normally runs, this control device 79 controls the axial position of the linear motion member (including the rotation-linear motion member) of the rotation-linear motion conversion mechanism 75 in the cylinder portion 59 by controlling the driving of the electric motor 56 based on, for example, a detection signal from the rotational angle detector, i.e., the positional information of the piston 72, a detection signal from the thrust force sensor, and detection signals from the detection sensor handling the request from the driver and the various detection sensors that detect various situations requiring brake.

Then, it is apparent that the respective biasing forces of the above-described elastic members 34 are set to a greater force than the sliding resistance of the inner and outer brake pads 2 and 3 on the inner-side and outer-side arm portions 14 and 17 of the bracket 5. Further, the respective biasing forces of the elastic members 34 are set to a greater force than the sliding resistance of the piston 72 on the cylinder bore 70 of the cylinder portion 59. Further, the respective biasing forces of the elastic members 34 are set to a greater force than the sliding resistance of the slide pins 64 and 64 coupled with the cylinder portion 59 on the pin fitted insertion portions 8 and 8 of the bracket 5. Further, the respective biasing forces of the elastic members 34 are set to a greater force than sliding resistance acquired by adding the sliding resistance of the piston 72 on the cylinder bore 70 of the cylinder portion 59 and the sliding resistance of the inner and outer brake pads 2 and 3 on the inner-side and outer-side arm portions 14 and 17. Furthermore, the respective biasing forces of the elastic members 34 are set to a weaker force than sliding resistance for actuating the rotation-linear motion conversion mechanism 75, The respective biasing forces of the elastic members 34 may be set to a force weaker than the sliding resistance of the piston 72 on the cylinder portion 59, and greater than a force acquired by adding the sliding resistance of the inner and outer brake pads 2 and 3 on the inner-side and outer-side arm portions 14 and 17 of the bracket 5 and the sliding resistance of the slide pins 64 and 64 coupled with the cylinder portion 59 on the pin fitted insertion portions 8 and 8 of the bracket 5.

Next, the functions at the time of the brake application and at the time of the brake release when the vehicle runs normally, which are exerted by the above-described disk brake 1 according to the present embodiment, will be described.

At the time of the brake application when the vehicle normally runs, the electric motor 56 is driven according to an instruction from the control device 79, and a rotation thereof in a brake application direction is transmitted to the rotation-linear motion conversion mechanism 75 via the speed reduction mechanism 74. As a result, the linear motion member (including the rotation-linear motion member) of the rotation-linear motion conversion mechanism 75 moves forward, thereby advancing the piston 72. Then, the piston 72 presses the inner brake pad 2 against the disk rotor D while elastically deforming the seal member between the piston 72 and the cylinder bore 70. Then, due to a reaction force to the pressing force from the piston 72 to the inner brake pad 2, the caliper main body 55 moves rightward in FIG. 2 relative to the bracket 5, thereby pressing the outer brake pad 3 against the disk rotor D with use of the pair of claw portions 60 and 60. As a result thereof, a frictional force is generated with the disk rotor D sandwiched between the pair of inner and outer brake pads 2 and 3, and this eventually leads to generation of a braking force on the vehicle.

At the time of the brake release, the electric motor 56 is driven according to an instruction from the control device 79, and a rotation thereof in a brake release direction is transmitted to the rotation-linear motion conversion mechanism 75 via the speed reduction mechanism 74. Then, the linear motion member (including the rotation-linear motion member) of the rotation-linear motion conversion mechanism 75 is retracted to return to the initial position, and the piston 72 is also retracted together with the linear motion member of the rotation-linear motion conversion mechanism 75. As a result, the pressing force from the piston 72 to the inner brake pad 2 is released, and the braking force exerted using the pair of inner brake pad 2 and the outer brake pad 3 is released.

Then, at the time of this braking release, the control device 79 controls the driving force of the electric motor 56, and therefore the position of the linear motion member (including the rotation-linear motion member) of the rotation-linear motion conversion mechanism 75 along the axial direction of the cylinder portion 59 is controlled by the control device 79. In sum, the linear motion member (including the rotation-linear motion member) of the rotation-linear motion conversion mechanism 75 is kept in the state of being retracted and stopped at the initial position thereof by the control device 79.

Then, the respective biasing forces of the elastic members 34 and 34 are set to a greater force than at least the sliding resistance of the piston 72 on the cylinder bore 70 of the cylinder portion 59 and are also set to a greater force than the sliding resistance of the slide pins 64 and 64 coupled with the cylinder portion 59 on the pin fitted insertion portions 8 and 8 of the bracket 5. As a result, at the time of the braking release, the inner brake pad 2 and the outer brake pad 3 can be reliably retracted in the axial direction of the disk rotor D and in the direction away from the disk rotor 1D under the biasing force of each of the elastic members 34 and 34.

At the time of the braking release, even in a state that the piston 72 is not yet retracted to the initial position, the piston 72 can also be retracted relative to the cylinder bore 70 together with the inner brake pad 2 under the biasing force of each of the elastic members 34 and 34. At this time, the piston 72 is retracted relative to the cylinder bore 70 under the biasing force of each of the elastic members 34 and 34, but is not retracted more than that and is stopped at the normal initial position because the linear motion member (including the rotation-linear motion member) retracted to the initial position of the rotation-linear motion conversion mechanism 75 serves as a stopper. This can prevent the piston 72 from excessively returning in the cylinder portion 59 under the biasing force of each of the elastic members 34 and 34, thereby preventing the occurrence of a problem with the responsiveness at the time of the brake operation.

Further, at the time of the braking release, the present configuration causes the linear motion member (including the rotation-linear motion member) of the rotation-linear motion conversion mechanism 75 to be pressed in the retraction direction under the biasing force of each of the elastic members 34 and 34 via the piston 72, but the respective biasing forces of the elastic members 34 and 34 are set to a weaker force than the sliding resistance for actuating the rotation-linear motion conversion mechanism 75, and therefore no rotation in the retraction direction is applied to the linear motion member (including the rotation-linear motion member) of the rotation-linear motion conversion mechanism 75 and the load on the electric motor 56 is reduced.

In the above-described manner, the disk brake 1 according to the present embodiment includes the elastic members 34 and 34 that bias the inner and outer brake pads 2 and 3 in the axial direction of the disk rotor D and in the direction away from this disk rotor D, and the biasing forces of these elastic members 34 are set to a greater force than the sliding resistance of the piston 72 on the cylinder portion 59. As a result, the piston 72 can be retracted to the initial position thereof in the cylinder portion 59 under, especially, the biasing forces of the pair of elastic members 34 and 34 on the inner side even in the state that the piston 72 is not yet retracted to the initial position at the time of the braking release. As a result, especially, the inner brake pad 2 can be retracted together with the piston 72 in the direction away from the disk rotor D against the sliding resistance between the piston 72 and the cylinder bore 70. Due to that, especially, the drag of the inner brake pad 2 can be prevented or reduced with the aid of, especially, the biasing forces of the pair of elastic members 34 and 34 on the inner side.

Further, in the disk brake 1 according to the present embodiment, the respective biasing forces of the elastic members 34 and 34 are set to a greater force than the sliding resistance of the cylinder portion 59 (the slide pins 64) on the bracket 5 (the pin fitted insertion portions 8). As a result, the outer brake pad 3 is retracted in the direction away from the disk rotor D under, especially, the biasing forces of the pair of elastic members 34 and 34 on the outer side at the time of the braking release. At this time, each of the slide pines 64 and 64 coupled with the cylinder portion 59 can be retracted to the outer side in each of the pin fitted insertion portions 8 and 8 of the bracket 5 against the sliding resistance on each of the pin fitted insertion portions 8 and 8 via the pair of claw portions 60 and 60. In this manner, especially, the outer brake pad 3 can be retracted in the direction away from the disk rotor D due to the return to the relative initial position between each of the slide pins 64 and 64 of the cylinder portion 59 and each of the pin fitted insertion portions 8 and 8 of the bracket 5. Due to that, especially, the drag of the outer brake pad 3 can be prevented or reduced with the aid of, especially, the biasing forces of the pair of elastic members 34 and 34 on the outer side.

Further, the disk brake 1 according to the present embodiment includes each of the elastic members 34 and 34, and therefore eliminates the necessity of retracting the linear motion member (including the rotation-linear motion member) of the rotation-linear motion conversion mechanism 75 and the piston 72 by a relatively long distance in consideration of a clearance (a mounting backlash) between the components of the rotation-linear motion conversion mechanism 75, thereby allowing the piston 72 to be retracted by a minimum required distance and thus improving the responsiveness of the brake operation. In addition, the disk brake 1 can absorb a clearance (a mounting backlash) between the rotation-linear motion conversion mechanism 75 and the piston 72 including the clearance (the mounting backlash) between the components of the rotation-linear motion conversion mechanism 75 with the aid of the biasing fierce of each of the elastic members 34 and 34, thereby further improving the responsiveness of the brake operation.

Furthermore, in the disk brake 1 according to the present embodiment, the respective biasing forces of the elastic members 34 and 34 are set to a weaker force than the sliding resistance for actuating the rotation-linear motion conversion mechanism 75. As a result, when the linear motion member (including the rotation-linear motion member) of the rotation-linear motion conversion mechanism 75 is pressed in the retraction direction under the biasing force of each of the elastic members 34 and 34 via the piston 72, no rotation in the retraction direction is applied to the rotational member (including the rotation-linear motion member) of the rotation-linear motion conversion mechanism 75, and the load on the electric motor 56 can be reduced.

Furthermore, in the disk brake 1 according to the present embodiment, the respective biasing forces of the elastic members 34 and 34 are set to a greater force than the sliding resistance acquired by adding the sliding resistance of the piston 72 on the cylinder bore 70 and the sliding resistance of the inner and outer brake pads 2 and 3 on the inner-side and outer-side arm portions 14 and 17. As a result, at the time of the braking release, the inner and outer brake pads 2 and 3 can be smoothly retracted in the axial direction of the disk rotor D and in the direction away from the disk rotor D under the biasing force of each of the elastic members 34 and 34, and therefore the drags of the inner brake pad 2 and the outer brake pad 3 can be reliably prevented or reduced.

Furthermore, in the disk brake 1 according to the present embodiment, the respective biasing forces of the elastic members 34 and 34 may be set to a force weaker than the sliding resistance of the piston 72 on the cylinder portion 59, and greater than the force acquired by adding the sliding resistance of the inner and outer brake pads 2 and 3 on the inner-side and outer-side arm portions 14 and 17 of the bracket 5 and the sliding resistance of the slide pins 64 and 64 coupled with the cylinder portion 59 on the pin fitted insertion portions 8 and 8 of the bracket 5. In this case, the piston 72 cannot be retracted slidably relative to the cylinder portion 59 (the cylinder bore 70) under the biasing force of each of the elastic members 34 and 34, but the caliper 4 and the inner and outer brake pads 2 and 3 can be retracted relative to the bracket 5 in the direction causing the inner and outer brake pads 2 and 3 to move away from the disk rotor D, as a result of which the drags of the inner brake pad 2 and the outer brake pad 3 can be reliably prevented or reduced.

Furthermore, the disk brake 1 according to the present embodiment is configured in such a manner that the pair of elastic members 34 and 34 on the inner side is provided between the inner-side support portion 9 of the bracket 5 and the inner brake pad 2 while the pair of elastic members 34 and 34 on the outer side is provided between the outer-side support portion 10 of the bracket 5 and the outer brake pad 3, thereby being able to simplify the structure for preventing or reducing the drags of the inner and outer brake pads 2 and 3.

Possible configurations as the disk brake 1 based on the above-described embodiment include the following examples.

According to a first configuration a disk brake includes a brake mechanism (76) configured to apply a braking force by advancing a piston (72) in a cylinder portion (59) based on driving of an electric motor (56) to thus press a pad (2, 3) against a disk rotor (D), and an elastic member (34) configured to bias the pad (2, 3) in an axial direction of the disk rotor (D) and in a direction away from the disk rotor (D). A biasing force of the elastic member (34) is greater than sliding resistance of the piston (72) on the cylinder portion (59).

According to a second configuration, in the first configuration, the piston (72) is configured to move forward in the cylinder portion (59) according to actuation of a rotation-linear motion conversion mechanism (75) to which a driving force of the electric motor (56) is transmitted. The biasing force of the elastic member (34) is weaker than sliding resistance for actuating the rotation-linear motion conversion mechanism (75).

According to a third configuration, in the first or second configuration, the pad (2, 3) is slidably supported on a mounting member (5) configured to be mounted on a non-rotational portion of a vehicle. The biasing force of the elastic member (34) is greater than a force acquired by adding the sliding resistance of the piston (72) on the cylinder portion (59) and sliding resistance of the pad (2, 3) on the mounting member (5).

According to a fourth configuration, in any of the first to third configurations, the cylinder portion (59) is slidably supported on the mounting member (5) configured to be mounted on the non-rotatable portion of the vehicle. The biasing force of the elastic member (34) is greater than sliding resistance of the cylinder portion (59) on the mounting member (5).

According to a fifth configuration, in any of the first to fourth configurations, the elastic member (34) is provided between the mounting member (5) configured to be mounted on the non-rotational portion of the vehicle and the pad (2, 3).

According to a sixth configuration, a disk brake includes a brake mechanism (76). The brake mechanism (76) includes a mounting member (5) configured to support a sliding movement of a pad (2, 3) and be mounted on a non-rotational portion of a vehicle, and a caliper (4) including a cylinder portion (59) and supported slidably in an axial direction of a disk rotor (D) relative to the mounting member (5). The brake mechanism (76) is configured to apply a braking force by pressing the pad (2, 3) against the disk rotor (D) using a piston (72) that slidably moves in the cylinder portion (59). The disk brake further includes an elastic member (34) configured to bias the pad (2, 3) in the axial direction of the disk rotor (D) and in a direction away from the disk rotor (D). A biasing force of the elastic member (34) is weaker than sliding resistance of the piston (72) on the cylinder portion (59) and greater than a force acquired by adding sliding resistance of the pad (2, 3) on the mounting member (5) and sliding resistance of the caliper (4) on the mounting member (5).

The present invention shall not be limited to the above-described embodiment, and includes various modifications. For example, the above-described embodiment has been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each embodiment can also be implemented with another configuration added, deleted, or replaced with respect to a part of the configuration of this embodiment.

The present application claims priority under the Paris Convention to Japanese Patent Application No. 2019-234340 filed on Dec. 25, 2019. The entire disclosure of Japanese Patent Application No. 2019-234340 filed on Dec. 25, 2019 including the specification, the claims, the drawings, and the abstract is incorporated herein by reference in its entirety.

REFERENCE SIGNS LIST 1 disk brake
2 inner brake pad (pad)
3 outer brake pad (pad)
4 caliper
5 bracket (mounting member)
34 elastic member
56 electric motor
59 cylinder portion
72 piston
75 rotation-linear motion conversion mechanism
76 brake mechanism
D disk rotor

The invention claimed is:

1. A disk brake comprising:
a brake mechanism configured to apply a braking force by advancing a piston from an initial position in a cylinder portion based on driving of an electric motor to thus press a pad against a disk rotor; and
an elastic member configured to bias the pad in an axial direction of the disk rotor and in a direction away from the disk rotor,
wherein a biasing force of the elastic member is greater than a sliding resistance of the piston on the cylinder portion such that, at the time of a braking release, the pad and the piston retract in the direction away from the disk rotor under the biasing force of the elastic member in a state in which the piston is not yet retracted to the initial position at the time of the braking release.

2. The disk brake according to claim 1, wherein the piston is configured to move forward in the cylinder portion according to actuation of a rotation-linear motion conversion mechanism to which a driving force of the electric motor is transmitted, and wherein the biasing force of the elastic member is weaker than a sliding resistance for actuating the rotation-linear motion conversion mechanism.

3. The disk brake according to claim 1, wherein the pad is slidably supported on a mounting member configured to be mounted on a non-rotational portion of a vehicle, and wherein the biasing force of the elastic member is greater than a force acquired by adding the sliding resistance of the piston on the cylinder portion and a sliding resistance of the pad on the mounting member.

4. The disk brake according to claim 1, wherein the cylinder portion is slidably supported on a mounting member configured to be mounted on a non-rotatable portion of a vehicle, and wherein the biasing force of the elastic member is greater than a sliding resistance of the cylinder portion on the mounting member.

5. The disk brake according to claim 1, wherein the elastic member is provided between a mounting member configured to be mounted on a non-rotational portion of a vehicle and the pad.

6. A disk brake comprising:
a brake mechanism including a mounting member configured to support a sliding movement of a pad and be mounted on a non-rotational portion of a vehicle, and a caliper including a cylinder portion and supported slidably in an axial direction of a disk rotor relative to the mounting member,
the brake mechanism being configured to apply a braking force by pressing the pad against the disk rotor using a piston that slidably moves in the cylinder portion; and
an elastic member configured to bias the pad in the axial direction of the disk rotor and in a direction away from the disk rotor,
wherein a biasing force of the elastic member is weaker than a sliding resistance of the piston on the cylinder portion and greater than a force acquired by adding a sliding resistance of the pad on the mounting member and a sliding resistance of the caliper on the mounting member.

7. The disk brake according to claim 2, wherein the pad is slidably supported on a mounting member configured to be mounted on a non-rotational portion of a vehicle, and wherein the biasing force of the elastic member is greater than a force acquired by adding the sliding resistance of the piston on the cylinder portion and a sliding resistance of the pad on the mounting member.

8. The disk brake according to claim 2, wherein the cylinder portion is slidably supported on a mounting member configured to be mounted on a non-rotatable portion of a vehicle, and wherein the biasing force of the elastic member is greater than a sliding resistance of the cylinder portion on the mounting member.

9. The disk brake according to claim 3, wherein the cylinder portion is slidably supported on the mounting member configured to be mounted on the non-rotatable portion of the vehicle, and wherein the biasing force of the elastic member is greater than a sliding resistance of the cylinder portion on the mounting member.

10. The disk brake according to claim 2, wherein the elastic member is provided between a mounting member configured to be mounted on a non-rotational portion of a vehicle and the pad.

11. The disk brake according to claim 3, wherein the elastic member is provided between the mounting member configured to be mounted on the non-rotational portion of the vehicle and the pad.

12. The disk brake according to claim 4, wherein the elastic member is provided between the mounting member configured to be mounted on the non-rotational portion of the vehicle and the pad.

13. The disk brake according to claim 1, wherein the elastic member comprises a pair of elastic members.

14. The disk brake according to claim 13, wherein the elastic members bias the brake pad in an axial direction of the disk rotor and in a direction away from the disk rotor.

* * * * *